March 5, 1968     J. U. DALY ET AL     3,371,864
VALVE REGULATOR MECHANISM
Filed Dec. 15, 1966     2 Sheets-Sheet 1
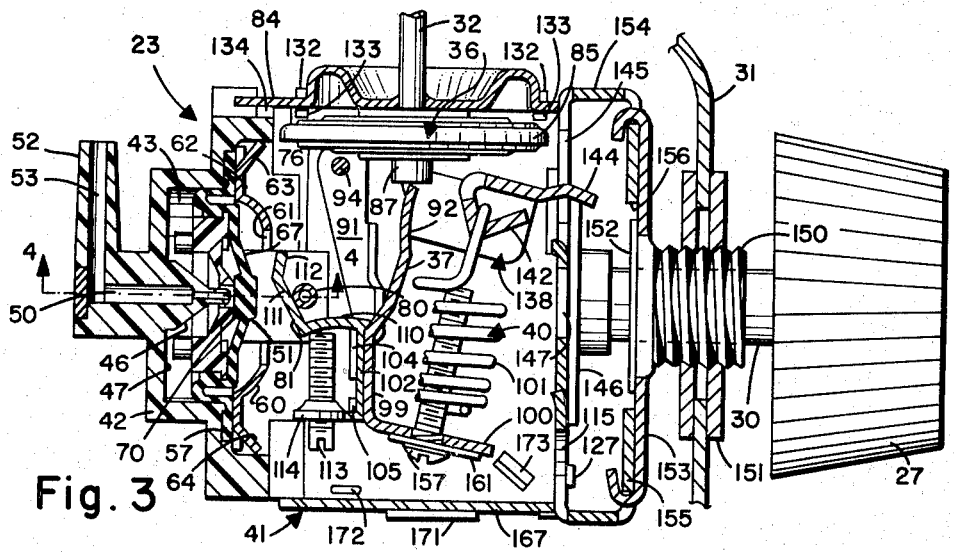
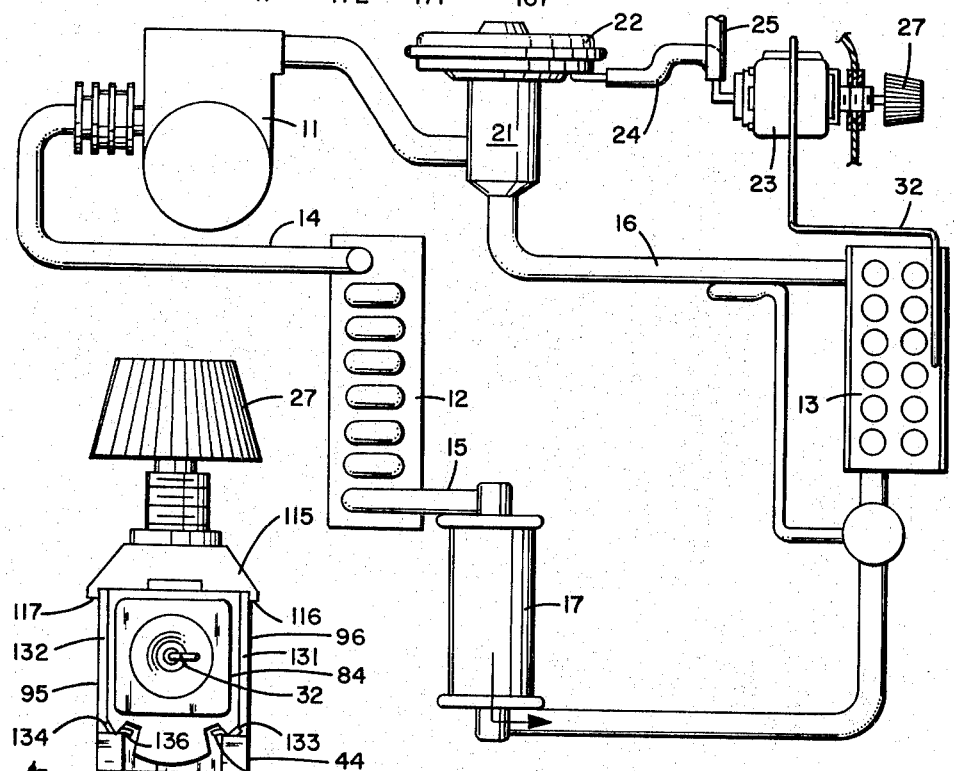
INVENTORS
JAMES U. DALY
GEORGE P. SALIARIS
ATTORNEYS

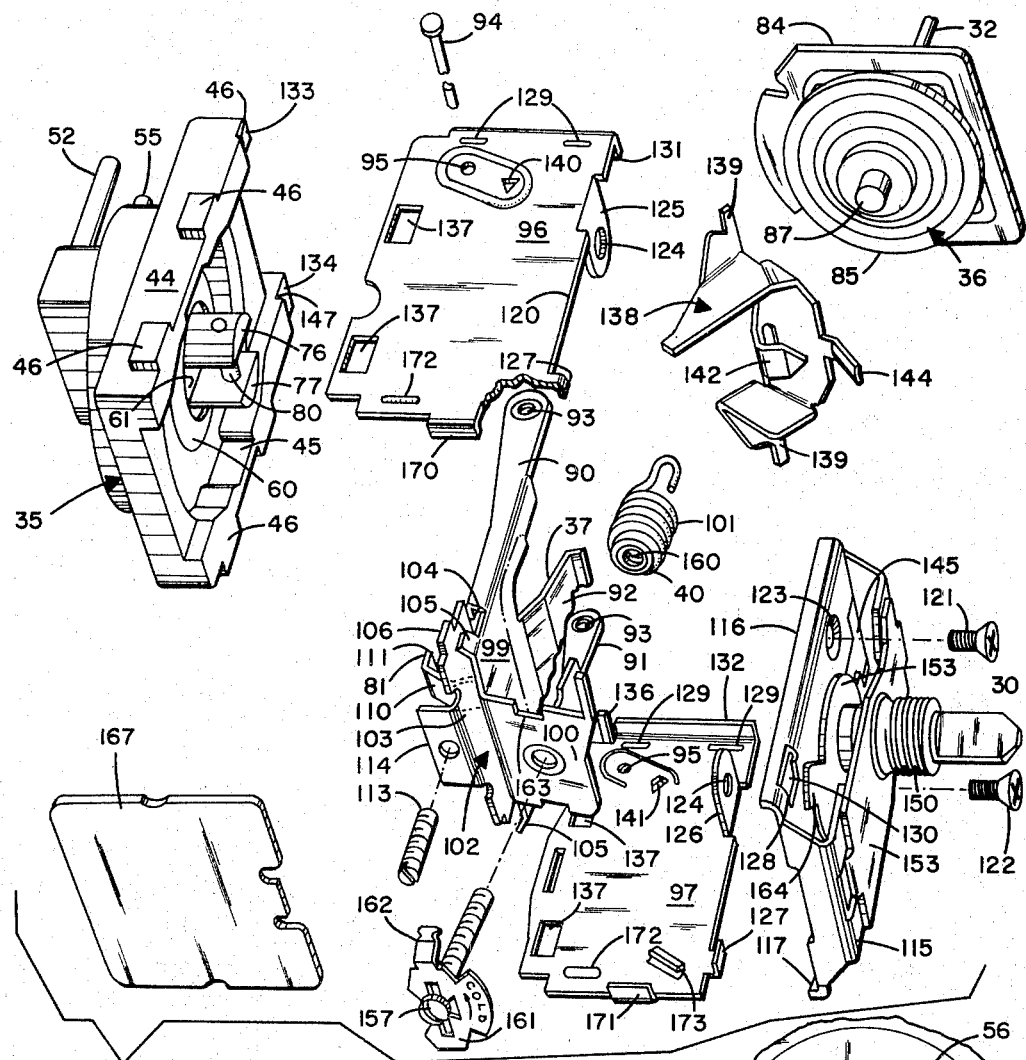
Fig. 2
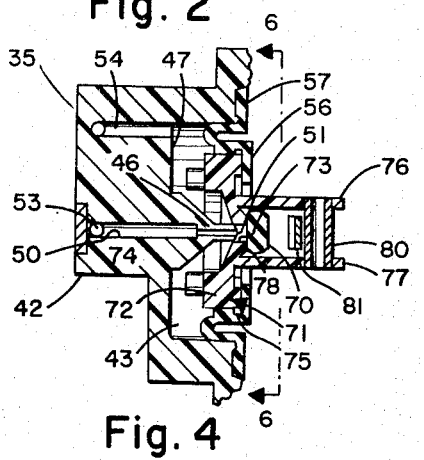
Fig. 4
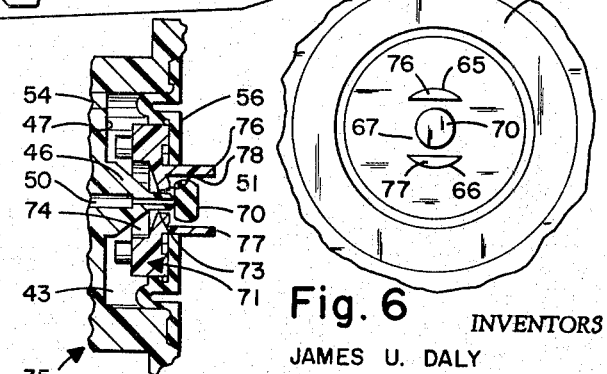
Fig. 5
Fig. 6
INVENTORS
JAMES U. DALY
GEORGE P. SALIARIS
ATTORNEYS

United States Patent Office 3,371,864
Patented Mar. 5, 1968

3,371,864
VALVE REGULATOR MECHANISM
James U. Daly and George P. Saliaris, Worthington, Ohio, assignors to Ranco Incorporated, Franklin County, Ohio, a corporation of Ohio
Filed Dec. 15, 1966, Ser. No. 602,102
3 Claims. (Cl. 236—86)

ABSTRACT OF THE DISCLOSURE

A vacuum regulator 35 and an expansible type thermostatic element 36 are supported on a frame comprised of two side plates 96, 97 interconnected by a face plate 115. The vacuum regulator is adapted to be connected to a source of vacuum which may vary, such as the intake manifold of an intake manifold of an internal combustion engine, not shown, through a tube 25 and is adapted to draw a vacuum in a tube 24 which has a subatmospheric pressure which is regulated so that it varies only in accordance with temperatures sensed by the element 36. The regulation of the vacuum in tube 24 is effected by providing a chamber 43 in communication with the tube 24 and having a valve port 51 to control the connection of the chamber with the tube 25 and the source of vacuum. The port 51 is adapted to be closed by a valve 70 on a flexible diaphragm 56 which forms one wall of the chamber 43. The valve 70 is adapted to close on a port 78 which is formed on a disc 71 attached to the diaphragm and which surrounds the port 51. When the port 78 is open, atmosphere is admitted into the chamber. The disc 71 and the central portion of the diaphragm 56 are shifted to open and close one or the other of the ports 51 or 78 by a bail structure attached to the disc 71 in the form of legs 76, 77, which extend through apertures in the diaphragm, and a pin 80 attached to the legs. The pin 80 is positioned by the action of a liner 37 pivoted between the side plates 96, 97 and which engages the element 36. A spring 101 biases the lever 37 to the element 36 and the pressure imposed by the lever on the element is selectively variable by a lever 138, to which one end of the spring is attached, which lever is movable about its pivot by a cam disc 153. The lever 37 is connected with the pin 80 by a deflectable arm 81, the angular position of which can be finely adjusted by a screw 113 arranged to deflect the arm according to rotary adjustment of the screw. The vacuum regulator is calibrated in one respect by this adjustment.

The present invention relates to apparatus for providing a source of subatmospheric pressures for actuating control means or the like and which subatmospheric pressure accurately correspond to changeable conditions, such as changes in temperature, and which are induced by a connection with a variable vacuum source, such as the intake manifold of an internal combustion engine of an automobile.

In certain type of temperature control system for an automotive vehicle, the effectiveness of a heat exchanger for heating the interior of the vehicle is controlled by a mechanism which is powered by vacuum or subatmospheric pressure responsive means the effective operation of the mechanism being proportional to the degree of vacuum present in a vacuum chamber connected with the intake manifold of the engine for the vehicle through valve means which is responsive to the temperature to be controlled for providing a given vacuum according to temperature sensed. The principal object of the present invention is the provision of a new and improved vacuum regulator mechanism of the type mentioned which can be readily calibrated at the factory and then manually adjusted in use to select different temperatures at which corresponding vacuums are to be maintained and which can be readily installed to sense temperatures which are remote from the mechanism.

Another object of the invention is the provision of a new and improved vacuum regulator mechanism of the character mentioned which is readily assembled into a compact, accurately operating unit.

Other objects and advantages of the invention will become apparent from the following description of a preferred form of the invention wherein:

FIG. 1 is a schematic view of an air conditioning system for an automobile embodying the invention;

FIG. 2 is an exploded view of a vacuum regulator employed in the system shown in FIG. 1;

FIG. 3 is a sectional view of the mechanism shown in FIG. 2, showing the parts in assembled relation;

FIG. 4 is a sectional view taken substantially along line 4—4 of FIG. 3 and on a larger scale;

FIG. 5 is a fragmentary view of the parts shown in FIG. 4 and showing certain parts in different positions;

FIG. 6 is a sectional view taken substantially along line 6—6 of FIG. 4; and

FIG. 7 is a plan elevational view of the vacuum regulator.

Referring to the drawings, an air cooling system for an automobile, not shown, is illustrated at 10 and which is controlled by a temperature responsive vacuum regulator embodying the invention. The system 10 comprises a conventional refrigerating system used in automobiles and includes a compressor 11, a condenser 12, and an evaporator 13 connected in a compressor-condenser-expander refrigeration circuit by conduits 14, 15 and 16. The compressor 11 is driven by the automobile engine in the usual manner and for sake of conciseness, the drive is not shown. The conduit 15 includes a liquid refrigerant receiver 17 and an expansion valve 20 which meters refrigerant into the evaporator 13 according to the temperature of the conduit 16 adjacent the outlet of the evaporator. Receivers and expansion valves of the type illustrated are well known in the art.

The conduit 16 includes a control valve 21 which controls the flow of refrigerant from the evaporator to the compressor in response to the pressure in the conduit 16 and the temperature at the evaporator 13, and the valve is actuated by a vacuum applied to the interior of a chamber 22 of the valve mechanism. A valve similar in function to valve 21 is disclosed in U.S. Patent 3,125,111. The vacuum in the chamber 22 is controlled by a thermostatic vacuum regulator mechanism 23 which includes a conduit 24 leading from the regulator to the chamber 22, and a conduit 25 leading from the intake manifold of the automobile engine, not shown, to the regulator. The vacuum produced in chamber 22 is induced by the vacuum in the intake manifold and in accordance with the regulator 23 which includes valve means between the intake manifold and the chamber, as is described more fully hereinafter.

The evaporator 13 is located so as to cool the air in the passenger compartment of the automobile, and is arranged to have air forced thereover by a suitable blower, not shown. It is common practice to cool automobile interiors by the evaporators of refrigerating systems of the general type illustrated and further explanation thereof is not important to the understanding of the invention. Suffice to say, the temperature of the air discharged from the evaporator 13 can be regulated within a given range by adjustment of a knob 27 on a shaft 30 of the regulator 23, which regulator is conveniently attached to the dash board 31 of the automobile with the shaft projecting through an opening in the dash board. The regulator 23 includes a temperature sensing tube 32 which is disposed to be subjected to the temperature of the evaporator 13, and the regulator is operative to control the vacuum produced in the chamber 22 of the valve 21 from the source of vacuum in the engine manifold.

Referring to the construction of the regulator 23, the regulator comprises a vacuum control valve means 35 which is actuated by an expansible power element 36 through the intermediary of a lever 37 and loading means 40, all of which are compactly assembled on a frame or casing 41.

The vacuum control valve means 35 may be of any suitable type and in the preferred form includes a molded body 42 having a cylindrical chamber 43 and a panel-like part having two oppositely disposed flanges 44, 45 which have lugs 46 thereon by which the body is secured to the frame 41, as described hereinafter. The interior of the chamber 43 has a stem 46 projecting axially from the end wall 47 thereof, and which stem has an axial passage 50 forming a valve port 51 at the outer end of the stem. The body 42 has a connector nipple 52 which has a passage 53 communicating with passage 50 and over which one end of the conduit 25 may be placed to connect the passage 50 with the intake manifold of the automobile engine. The conduit 25 is preferably a tube of rubber-like material which sealingly grips the nipple 52 to hold the conduit in sealing engagement with the nipple.

A second passage 54 is formed through the wall 47 and opens in the chamber 43, and this passage is in communication with a tubular nipple 55 which projects from the body 42 parallel to the nipple 52 and over which one end of the conduit 24 is received to connect the chamber 43 with the chamber 22 of the control valve 21. The conduit 24 is similar to the conduit 25 and is secured over the nipple 55 in the same manner.

A circular flexible diaphragm 56 is disposed over one end of the chamber 43 and the peripheral edges thereof have a bead 57 which is received in an annular groove about the edges of the open side of the chamber. The bead 57 is clamped in the groove by a retainer plate 60 which is dish-shaped and has a central opening 61 therethrough. The plate 60 is formed of a resilient metal and has an annular rim 62 which bears against the outer peripheral edge of the diaphragm, and spring tabs, two of which are shown at 63, 64, are struck from the outer edges of the plate and form ratchet teeth which engage the side walls of the body 42 which extend from about the end of the chamber 43 closed by the diaphragm 56, and retain the plate in firm engagement with the diaphragm.

The central portion of the diaphragm 56 has two parallel apertures 65, 66 which form a strip 67 extending across the central open portion of the diaphragm. The strip 67 has a pad 70 of greater thickness than the diaphragm proper and is adapted to form a valve member for closing on the port 51 and seal off the passage 50 leading to the source of vacuum.

A washer assembly 71 is embraced by the inner surface of the diaphragm 56 at the central portion thereof which has a circular recess shaped to receive the outer sides of the washer assembly and a radial flange 75. The washer assembly 71 comprises a molded annular body member 72 having a central opening 73 and a recess 74. The opening 73 is larger in diameter than the outer end portion of the stem 46 and is retained co-axial therewith by the diaphragm 56. The outer edge of the opening 73 through the washer assembly 71 is raised to form a valve port 78.

The washer member 72 has two legs 76, 77 projecting therefrom and extending through the apertures 65, 66 in the diaphragm 56 and each has an opening therethrough which receives the ends of a pin 80. As is explained more fully hereinafter, the legs 76, 77 and pin 80 form a bail by which the washer assembly 71 and the diaphragm valve pad 70 are moved relative to the port 51 by an arm 81 of the lever 37 to tend to open and close the port.

The operation of the valve means formed by the ports 51, 78 and the valve pad or member 70 is as follows: when the chamber 43 is at atmospheric pressure, the valve member 70 will be removed from the port 51 by the washer assembly 71 moving towards the right as viewed in FIG. 4 with the port 78 engaging the valve member 70 of the diaphragm because of the bias of the arm 81. Assuming that a high vacuum is applied to the passage 50 from the engine intake manifold, a vacuum will be drawn in the chamber 43, tube 24 and valve chamber 22. When the vacuum in the chamber 43 increases to a point at which the atmospheric pressure on the diaphragm 56 moves the diaphragm and the washer assembly 71 inwardly of the chamber, the valve member 70 closes on the port 51 to close off the engine manifold vacuum. Should the vacuum in chamber 43 be in excess of that indicated by the vacuum port opening bias of arm 81, the inward movement of the diaphragm 56 and the washer assembly 71 moves the port 78 from the valve member 70 and moves inwardly of the chamber permitting atmospheric air to enter the chamber through the opening 73, as seen in FIG. 5. The reduction in the vacuum results in outward movement of the diaphragm and the valve port 78 closes on the valve member 70, closing off the chamber to atmosphere. It will be seen that by applying a constant outward bias of the arm 81 on the pin 80 relative to the port 51, a given degree of vacuum can be maintained in the chamber 43, and that by varying the bias of the arm 81, the degree of vacuum in the chamber 43 can be correspondingly varied.

According to the present invention, the bias of the arm 81 is regulated by the power element 36 according to the temperature at the evaporator 13. The power element 36 is of a conventional construction, and comprises a generally rectangular sheet metal base plate 84 which is attached to the frame 41 as described hereinafter, and a metal wafer type diaphragm or bellows 85 is attached to one side of the plate. The bellows 85 is formed of two dish shaped corrugated metal discs arranged face to face with the concave portions outwardly and having the rim of one telescoped with the rim of the other to form an expansible chamber, the telescoped edges being brazed to seal the chamber. The interior of the chamber is in communication with the capillary tube 32 one end of which is attached to the bellows, and the tube and bellows contain a vapor fill of a suitable gas, such as a refrigerant. The vapor pressure inside the bellows corresponds to the lowest temperature of the fluid in the tube 32 and bellows 85 which low temperature is normally at the outer end portion of the tube at the evaporator 13. Thus, the pressure in the bellows or diaphragm 85 will correspond to the temperature at the evaporator, at least during operation of the air cooling system.

The bellows 85 has a post 87 on one wall thereof which engages the lever 37 and moves the lever when the bellows expands. The lever 37 is formed of a metal stamping and has a W configuration with two outer legs 90, 91 and a central leg 92. The legs 90, 91 have openings 93 through the extremities thereof which receive a pivot pin 94, the ends of which are supported in openings 95 in opposite sides 96, 97 of the frame 41.

The yoke portion 99 of lever 37 has a tab portion 100 to which a tension spring 101 is attached and which spring urges the lever 37 counterclockwise, as viewed in FIG. 2, to press the end of the leg 92 against the post 87 of the bellows. The tension of the spring 101 exerted on the arm 37 can be adjusted by turning the knob 27 through means described hereinafter so that the outer wall of the bellows 85 will move at different temperatures at the evaporator, according to the load imposed by the spring 101.

The yoke 99 of the lever 37 has a hook plate 102 rigidly attached thereto, which plate is formed of a resilient metal stamping having a panel 103 which is attached to one face of the yoke 99 by crimping flanges 104, 105, formed on opposite edges of the yoke and which are folded or bent over the edges of the hook plate. The hook plate has laterally projecting lugs 106 which lie between the two sets of flanges 104, 105 and locate the plate relative to the yoke of the base 37. The plate 102 has the arm 81 extending therefrom which is generally L-shaped and is adapted to extend between the lugs 76, 77 of the washer assembly 71 and engage the pin 80 for moving the washer assembly and the diaphragm 56 from the port 51.

It is important to provide means to accurately position the arm 81 relative to the lever 37 proper for calibrating the regulator, and according to the present invention, the arm 81 has a section 110, which extends laterally of the plate 102, and a section 111 which projects at approximately 90° from the section 110. The end portion 112 of the section 111 is deflected towards lever 37 proper. The arrangement is such, as seen in FIG. 3, that by flexing the section 110 of the arm 81 clockwise relative to the plate 102, the section 111 of the arm acts as a cam to shift the pin 80 and the washer assembly 71 from the valve port 51 with a wedging action. The section 111 of the arm 81 is flexed by an adjusting screw 113 which is threaded in an opening through a flange 114 extending at right angles to the plate 102. One end of the screw 113 engages the section 110 and when the screw is threaded into the opening it flexes the arm 81 clockwise and moves pin 80 towards the lever 37 proper. When the screw 113 is backed off, the section 110 returns or follows the screw because of the resiliency of the material forming the plate 102 and the arm 81.

The frame 41 is formed of the two oppositely disposed side plates 96, 97 which are interconnected at one side by a face plate 115. The face plate has two opposed edge flanges 116, 117 which overlie the edges 120 of the plates 96, 97. One end of the plates 96, 97 are secured to the face plate 115 by screws 121, 122 which are threaded through openings in the face plate, one of which openings appears at 123, and which screws are threaded in openings 124 formed in inwardly projecting tabs 125, 126 formed on the respective side plates. The other ends of the side plates 96, 97 are held to the face plate by inturned lugs 127 which are received in generally L-shaped openings 128 in the face plate and which overlie areas 130 adjacent the openings 128 which position is effected by sliding the face plate downwardly, as viewed in FIG. 3, when the side plates 96, 97 are positioned with the tabs 127 through the lower sections of the openings 128. Only one opening 128 is shown.

The two side plates 96, 97 have inwardly turned end flanges 131, 132, respectively, and indents 129 spaced inwardly from the end flanges so as to form parallel guide surfaces for receiving opposite edges of the plate 84 of the power element 36 therebetween. Thus, the power element can be slid into the upper end of the frame between the flanges and indents after the face plate 115 has been assembled to the side plate and retained in position by the end flanges 131, 132, the indents 129 and the plate 115 which overlies the end flanges.

The plate 84 is secured in position between the side plates 96, 97 by shoulders 133, 134 on the flanges 41, 45 of vacuum regulator 35 when the regulator is secured across the side of the frame opposite the face plate 115, as seen in FIG. 7. The regulator 35 is attached between the plates 96, 97 by the lugs 46 entering rectangular openings 127, two of which are formed in each of the side plates, and by thin fingers 135, 136 which are formed on the side, and which are bent against the shoulders 146, 147. The thin strip of plates separating each of the openings 137 and the adjacent edge of the respective side plates is deformed to press against the lugs 46 to secure the lugs firmly in the openings.

Referring more particularly to the mechanism for adjusting the spring 101, at the time the elements of the regulator are assembled, a U-shaped arm 138 formed of a sheet metal stamping, is positioned between the side plates 96, 97 and is formed with laterally projecting lugs 139 on opposite sides thereof which extend into triangular openings 140, 141 formed in the side plates 95, 96 and the edges of which form knife edges with the sides of the triangular openings to provide a pivot for the lever 138. A hook portion 142 is formed on the yoke portion of the lever 135 and is adapted to receive the hooked end of the tension spring 101. A tongue 144 is also formed on the yoke of the lever 138 and it projects through an opening 145 in the end plate 115. The tongue 144 engages the periphery of a cam disc 146 which cam is attached to the shaft 30 adjacent to the end 147 thereof which is journaled in an opening in the end plate 115. The other end portion of the shaft 30 extends through an externally threaded bushing 150 which is secured in an opening in the dashboard 31 and which is secured thereto by two nuts 151. The shaft 30 is retained with the end 147 in the opening of the face plate 115 by a washer 152 which bridges the opening in a bracket plate 153 secured to end tabs 154, 155 of the face plate, which end tabs are bent in a reverse form to provide supports spaced from the plate 115 proper and which has an opening 156 to receive the shaft 30 and the bushing 150. The washer 152 engages the inside of the plate 153 to prevent axial movement of the shaft 30 to the right as viewed in FIG. 3.

The cam 146 is attached to the shaft 30 and is rotated thereby to cause the lever 138 to be shifted about its pivot and change the tension of the spring 101, which is attached at one end to the lever 37 by a screw 157 which extends through an opening in the tab portion 100 of the lever. The screw 157 is threaded into a nut 160, the exterior of which has threads which are gripped by the end convolutions of the spring 101 whereby rotation of the screw 156 may change the position of the nut 160 therealong and provide for calibrating adjustment of the tension of the spring 101 independently of movement of the lever 138. Preferably, an indicator plate 161 is interposed between the tab portion 100 and the head of the screw 157 for providing indicia for calibration. Plate 161 has a finger 162 which engages in a notch 163 formed in the tab 100 to prevent rotation of the plate 161.

The cam 146 has a lug 164 projecting therefrom, the sides of which are adapted to engage the tongue 144 and form a limit for rotation of the shaft 30 at opposite ends of the range of adjustment of the knob 27.

It will be seen that the construction of the regulator 23 is compact and is effective by a minimum of parts. The vacuum valve structure and the power element form sides of the frame and are interconnected by the lever 37 pivoted between the side walls of the frame in a manner to efficiently provide for actuation of the vacuum valve by readily calibrated and manually adjustable mechanisms.

The end of the frame opposite the power element 36 is adapted to be closed by a fibre board panel 167, the side edges of which are received between end flanges 170, 171 and indentations 172 and shoulders 173 formed on the plates 95, 96.

Although but one form of the invention has been described, it will be apparent that other forms, modifications and adaptations can be made thereof, all falling within the scope of the claims which follow.

We claim:

1. A vacuum regulator comprising a frame, an expansible power element supported on said frame, a vacuum control valve including a body having a recess and a movable wall substantially closing one end of said recess and adapted to operate valve means in said chamber, a lever on said frame, said lever being engaged by said power element and movable in one direction by expansion of said element, loading means urging said lever in the opposite direction, and means interconnecting said lever and said movable wall for operating said valve means comprising a bail structure including a yoke on said movable wall, a resilient L-shaped arm projecting from said lever and having a laterally projecting portion extending into engagement with said yoke, and means for adjustably flexing said arm relative to said lever.

2. A vacuum regulator as defined in claim 1 further characterized by said last-mentioned means comprising a flange supported on said lever and extending in spaced relation to the portion of said arm extending immediately from said lever, and a screw threaded in an opening through said flange and engaging said portion of said arm.

3. A vacuum regulator as defined in claim 2, further characterized by said frame comprising two opposite side plates and an end plate interconnecting said side plates along an end edge thereof, said expansible power element including a support plate closing one side of said frame, said vacuum control valve having a body portion closing a side of said frame adjacent said side closed by said support plate of said power element.

References Cited
UNITED STATES PATENTS

| | | | |
|---|---|---|---|
| 2,626,507 | 1/1953 | Dickieson | 236—86 X |
| 3,125,111 | 3/1964 | Daly | 236—86 X |
| 3,319,888 | 5/1967 | Creager | 236—86 |
| 3,329,342 | 7/1967 | Obermaier | 236—86 |

WILLIAM J. WYE, *Primary Examiner.*